(12) United States Patent
Vanderhye

(10) Patent No.: US 11,524,260 B2
(45) Date of Patent: Dec. 13, 2022

(54) ATMOSPHERIC GREENHOUSE GAS REMOVAL

(71) Applicant: Robert A. Vanderhye, McLean, VA (US)

(72) Inventor: Robert A. Vanderhye, McLean, VA (US)

(\*) Notice: Subject to any disclaimer, the term of this patent is extended or adjusted under 35 U.S.C. 154(b) by 840 days.

(21) Appl. No.: 15/732,868

(22) Filed: Jan. 8, 2018

(65) Prior Publication Data

US 2018/0135847 A1 May 17, 2018

Related U.S. Application Data

(62) Division of application No. 13/318,357, filed as application No. PCT/US2010/022168 on Jan. 10, 2010, now Pat. No. 8,545,081.

(Continued)

(51) Int. Cl.
*B01D 53/62* (2006.01)
*B01D 53/78* (2006.01)
(Continued)

(52) U.S. Cl.
CPC .............. *B01D 53/62* (2013.01); *B01D 53/78* (2013.01); *C05C 3/00* (2013.01); *C05D 1/00* (2013.01); *C05G 5/45* (2020.02); *F03D 3/005* (2013.01); *F03D 3/061* (2013.01); *F03D 9/11* (2016.05); *F03D 9/25* (2016.05); *F03D 9/28* (2016.05);
(Continued)

(58) Field of Classification Search
None
See application file for complete search history.

(56) References Cited

U.S. PATENT DOCUMENTS

| | | |
|---|---|---|
| 3,809,746 A | 5/1974 | Takahashi et al. |
| 4,919,910 A | 4/1990 | Kurtz et al. |

(Continued)

FOREIGN PATENT DOCUMENTS

WO  WO2008/131132  \* 10/2008  .............. B01D 53/02

OTHER PUBLICATIONS

Cheng et al, "Invesitgation of Carbon Distribution with 14C as Tracer for Carbon Dioxide Sequestration . . . "; Energy Fuels Journal, 2007, #21, Issue 6, pp. 3334-3340, Sep. 18, 2007.

(Continued)

*Primary Examiner* — Daniel Berns

(57) ABSTRACT

A material (such as potassium hydroxide or ammonia) capable of reacting with ambient carbon dioxide to produce fertilizer is placed in the path of ambient air movement. Desirably the material is associated with a fabric which in turn is associated with a vane of a vertical axis wind turbine, the turbine performing useful work as well as supporting the material which produces a fertilizer. A misting system controlled by a controller may automatically apply a water mist to the material if the humidity is below a predetermined level. The fabric with produced nitrogen and/or potassium fertilizer may be placed directly into contact with soil, or shredded first, or burned to produce energy and an ash (and the ash applied to the soil). The wind turbine may have a convenient, versatile mounting system with three adjustable legs supporting a central component, and the spokes of the wind turbine may be slotted for easy assembly with vanes.

17 Claims, 9 Drawing Sheets

Related U.S. Application Data

(60) Provisional application No. 61/279,311, filed on Oct. 19, 2009, provisional application No. 61/274,006, filed on Aug. 13, 2009, provisional application No. 61/215,612, filed on May 7, 2009.

(51) Int. Cl.

| | |
|---|---|
| *F03D 13/20* | (2016.01) |
| *F03D 9/11* | (2016.01) |
| *F03D 9/25* | (2016.01) |
| *F03D 9/28* | (2016.01) |
| *F03D 3/00* | (2006.01) |
| *F03D 3/06* | (2006.01) |
| *C05G 3/00* | (2020.01) |
| *C05D 1/00* | (2006.01) |
| *C05C 3/00* | (2006.01) |
| *C05G 5/00* | (2020.01) |
| *F21V 29/51* | (2015.01) |
| *F21V 29/67* | (2015.01) |
| *F21V 29/76* | (2015.01) |
| *F21V 8/00* | (2006.01) |
| *G02F 1/1335* | (2006.01) |
| *F21Y 103/10* | (2016.01) |
| *F21Y 115/10* | (2016.01) |
| *G02F 1/13357* | (2006.01) |

(52) U.S. Cl.
CPC .............. *F03D 13/20* (2016.05); *F21V 29/51* (2015.01); *F21V 29/67* (2015.01); *F21V 29/767* (2015.01); *G02B 6/0078* (2013.01); *G02B 6/0085* (2013.01); *B01D 2251/2062* (2013.01); *B01D 2251/306* (2013.01); *B01D 2251/602* (2013.01); *B01D 2251/604* (2013.01); *B01D 2251/606* (2013.01); *B01D 2257/504* (2013.01); *B01D 2259/4558* (2013.01); *F05B 2240/213* (2013.01); *F05B 2240/301* (2013.01); *F21Y 2103/10* (2016.08); *F21Y 2115/10* (2016.08); *G02B 6/0046* (2013.01); *G02F 1/133615* (2013.01); *G02F 1/133628* (2021.01); *Y02C 20/40* (2020.08); *Y02E 10/74* (2013.01); *Y02P 20/151* (2015.11)

(56) References Cited

U.S. PATENT DOCUMENTS

| | | |
|---|---|---|
| 5,214,019 A | 5/1993 | Nalette et al. |
| 6,312,655 B1 | 11/2001 | Hesse et al. |
| 6,447,437 B1 | 9/2002 | Lee et al. |
| 7,098,552 B2 | 8/2006 | McCoin |
| 9,382,165 B1 | 7/2016 | Vanderhye |
| 2002/0104347 A1* | 8/2002 | Sakamoto ............... C05B 17/00 71/27 |
| 2006/0051274 A1 | 3/2006 | Wright et al. |
| 2006/0153682 A1 | 7/2006 | Vanderhye et al. |
| 2006/0178271 A1* | 8/2006 | Lynch ................... A01N 25/12 504/363 |
| 2006/0289003 A1 | 12/2006 | Lackner et al. |

OTHER PUBLICATIONS

Zhou et al, "A Feasibility Study on a two Stage Benefits CO2 Sequestration Technology . . . "; 1st Annual Conference on carbon sequestration, May 15-17, 2001, Virginia.

"Scrubbing the Skies", The Economist Technology Quarterly, Mar. 7, 2009, pp. 22 & 24.

* cited by examiner

ATMOSPHERIC GREENHOUSE GAS REMOVAL

CROSS REFERENCE TO RELATED APPLICATIONS

This application claims the priority of U.S. provisional application Ser. 61/215,612 filed May 7, 2009, Ser. 61/274,006 filed Aug. 13, 2009, and Ser. No 61/279,311 filed Oct. 19, 2009. This application is a divisional of application Ser. No. 13/318,537 filed Nov. 2, 2011, now U.S. Pat. No. 9,896,386, which is the National Phase of PCT/US2010/022168.

BACKGROUND AND SUMMARY OF THE INVENTION

It has been considered desirable for many years to be able to effectively remove pollutants from the ambient atmosphere in a way such that they will not likely re-enter the environment, and with a minimum of energy input. The invention relates to a method and apparatus for accomplishing that result which is particularly suitable for removing the greenhouse gas carbon dioxide from the atmosphere, establishing the carbon dioxide as a component of a plant fertilizer, and using the fertilizer to treat plants.

The invention is particularly useful for sequestering the greenhouse gas carbon dioxide in a substantially permanent manner. At the same time, other useful work is performed according to the invention so that other objectives can also be met, such as generating electrical energy, pumping liquid, compressing gas, rotating a propeller, or other useful work, and producing fertilizer for application to plants.

According to the invention, it has been determined that potassium containing compounds, such as potassium hydroxide (KOH), and nitrogen containing compounds, such as ammonia ($NH_3$), can be successfully used at ambient temperature and pressure to produce fertilizers by reacting with carbon dioxide in the ambient environment, especially when sufficient moisture is present. The fertilizers produced can be applied directly to land areas where plant growth is desirable, and most of the carbon dioxide will either be taken up by the plants, or sequestered substantially permanently in the soil, especially if the soil has sufficient amounts of calcium and magnesium. [The term "soil" as used herein means any conventional plant growing media]. Some reactions (which are all possible at ambient conditions, even though they might be enhanced at high temperature and/or pressure conditions) that demonstrate these possibilities are:

For potassium:

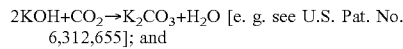

$2KOH+CO_2 \rightarrow K_2CO_3+H_2O$ [e. g. see U.S. Pat. No. 6,312,655]; and

$CO_2+K_2CO_3+H_2O \rightarrow 2KHCO_3$ [e. g. see U.S. Pat. No. 4,919,910];

or one can start with potassium superoxide ($KO_2$) and the initial reaction will be

$4KO_2+2 H_2O 4KOH+O_2$

For nitrogen:

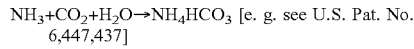

$NH_3+CO_2+H_2O \rightarrow NH_4HCO_3$ [e. g. see U.S. Pat. No. 6,447,437]

$K_2CO_3$ is potassium carbonate and $KHCO_3$ is potassium bicarbonate, and both are known potassium fertilizers that do not have salt buildup (as sometimes occurs when KCl is used as a fertilizer). $NH_4HCO_3$ is ammonium bicarbonate, and is a common desirable nitrogen fertilizer. None of these are known to have any significant adverse environmental impact.

In order to practice the invention, preferably a potassium containing compound that will react with $CO_2$ (e. g. potassium hydroxide, potassium carbonate, or potassium superoxide), and/or a nitrogen containing compound that will react with $CO_2$ (e.g. ammonia), are applied to a vane surface of a wind turbine rotor or the like. One desirable way this is done is by applying KOH or ammonia to fabric, which in turn is mounted on, or consists essentially of, a vane of a vertical axis wind turbine (VAWT). The invention also relates to using such a fabric in ambient air flow even if not part of a wind turbine.

When the potassium and nitrogen fertilizers produced as indicated above are applied to soil with plants, the carbonates are partially taken up by the plants and used to produce biomass. In a study done by Cheng et al and reported in the Sep. 18, 2007 "Energy Fuels" Journal, #21, Issue 6, pp. 3334-3340, using ammonium bicarbonate, about 10% of the carbonate was taken up by the plants. As much as 70% of the carbonate reacted with materials in the soil to produce stable compounds (such as calcium carbonate) which sequester the carbon long term, while the relatively small remainder was released back to the atmosphere as carbon dioxide. If the soil is particularly alkaline (e. g. containing significant amounts of calcium and magnesium), then the amount of carbon sequestration by the soil may be substantially maximized. Therefore, the fertilizer application could be accompanied, preceded, or followed by the application of calcium and/or magnesium, or the like, to the soil.

If the air and surroundings at the wind turbine do not have sufficient moisture (certainly where the relative humidity of the air is consistently less than about 40%, or if the climate is particularly dry), then a mist may be sprayed into the path of the rotating vanes of the wind turbine containing the potassium and nitrogen compounds to facilitate the chemical reactions. The mist is typically sprayed using one or more stationary (with respect to vane rotation) nozzles, or comparable structures, positioned adjacent the wind turbine vane path of movement, and spraying may be synchronized with the rotation of the turbine vanes, and interrupted if the wind speed and/or relative humidity exceed a particular threshold, or if the wind speed is below a particular value.

After a sufficient amount of carbon dioxide has been captured by the fabric (which may be sensed by a material which changes color in the presence of carbonates, or determined empirically) of the wind turbine vanes, the fabric is removed. The fabric may be incorporated as is in the soil; or the fabric may be shredded and applied as fertilizer as is, depending upon the type of fabric utilized. Alternatively, the fabric may be burned to produce energy, and the remaining ash—containing the potassium and/or nitrogen compounds—applied to the soil. The ash would have a tendency to make the soil more alkaline, thus likely enhancing the ultimate percentage of carbon sequestration.

While it is highly desirable to use potassium carbonate, potassium bicarbonate, or ammonium bicarbonate according to the invention as a fertilizer, instead they may be used for any other purpose that they commonly are used for. For example, potassium carbonate is often conventionally used in the manufacture of glass, enamels, and soaps. Also, if desired, the starting materials can be regenerated, if this is economical. For example, potassium carbonate can be reacted with calcium hydroxide to produce KOH and calcium carbonate.

According to one aspect of the invention, there is provided a method of removing carbon dioxide from a substantially ambient atmosphere by placing at least one material capable of reacting with carbon dioxide to produce fertilizer in the path of movement of substantially ambient air. When practicing the method the material may comprise a potassium and/or nitrogen containing compound that will ultimately react with ambient carbon dioxide, and the fertilizer produced may be potassium carbonate, potassium bicarbonate, and/or ammonium bicarbonate, and is ultimately put into contact with soil to fertilize plants.

In the practice of the method, the material capable of reacting with carbon dioxide may be associated with a fabric, and the method may comprise placing the fabric in the path of ambient air movement. For example, the method may further comprise placing the fabric and material on a moving portion of a wind turbine; and wherein the wind turbine provides mechanical force; and further comprising utilizing the mechanical force to perform useful work (such as pumping water or other liquid, generating electricity, compressing air or other gas, etc.).

The method may further comprise applying a mist containing water to the material at spaced time intervals if the humidity and/or related conditions are insufficient to provide acceptable reaction conditions, for example if the humidity of the ambient air is less than about 40-50%. Mist application may be practiced using at least one nozzle stationarily, with respect to wind turbine rotation, positioned below the wind turbine and controlled by a controller.

Preferably the fabric is relatively easily biodegradable when in contact with soil (e. g. it is a woven, knit, or nonwoven of natural fibers such as cotton, flax, hemp, etc.), and the method further comprises, after carbon dioxide removal to produce fertilizer, putting the fabric into direct contact with soil, or shredding the fabric and then putting the fabric into contact with soil. Alternatively the method may further comprise burning the fabric to produce useful energy and an ash, and applying the resulting ash to soil.

The starting carbon dioxide removing material may be KOH or ammonia, and the material produced as a result of carbon dioxide removal may be potassium carbonate, potassium bicarbonate, or ammonium bicarbonate. In order to enhance the sequestration of carbon dioxide, the method may further comprise applying calcium and/or magnesium to the soil to which the fertilizer is applied.

According to another aspect of the invention there is provided the combination of: a vertical axis wind turbine having vanes with a material associated therewith capable of reacting with ambient carbon dioxide when sufficient moisture is present; and apparatus which applies a water mist to the material; and wherein the apparatus comprises at least one nozzle controlled by a controller and mounted below the turbine vanes for directing a water mist so that it contacts the material on the vanes. In the combination, the at least one nozzle may comprise a plurality of sets of nozzles, one set of nozzles for each vane of the vertical axis wind turbine. The combination also preferably further comprises an ambient humidity and/or moisture sensor operatively connected to the controller to control the at least one nozzle to apply a mist should the ambient humidity and/or moisture drop below a predetermined level (e. g. below about 40-50%). A wind sensor is also preferably connected to the controller to retard or interrupt mist application if the wind speed is either higher or lower than predetermined thresholds (e. g. greater than 25 mph or less than 5 mph).

In the combination, the at least one nozzle may be movable and the combination may further comprise an actuator controlled by the controller for moving the at least one nozzle to position it to direct water mist in varying directions.

According to another aspect of the invention there is provided a method of removing carbon dioxide from substantially ambient air by placing at least one of a potassium containing compound and a nitrogen containing compound, in a form capable of reacting with carbon dioxide to produce a second potassium or nitrogen containing compound (e. g. potassium carbonate, potassium bicarbonate, or ammonium bicarbonate), in the path of movement of substantially ambient air; and then after carbon dioxide removal from the substantially ambient air, regenerating at least one of a potassium containing compound and a nitrogen containing compound from the second potassium or nitrogen containing compound. Preferably the material capable of reacting with carbon dioxide is associated with a fabric, and the method further comprises placing the fabric and material on a moving portion of a wind turbine; and wherein the wind turbine provides mechanical force and the method further comprises utilizing the mechanical force to perform useful work.

The VAWT is preferably mounted by a portable mounting system which comprises: a drive shaft; a substantially tubular central component; a bearing mounting the drive shaft for rotation within the substantially tubular central component; at least three support legs, at least one of which is telescopic, extending at an angle from the central component and each having a free end; a foot movably mounted adjacent the free end of each of at least two of the support legs; and a load operatively connected to the drive shaft (and which may be operatively connected to at least one of the support legs too). A quick connect/disconnect coupling is provided between the rotor shaft and drive shaft. In order to readily ship the mounting system, an attachment plate may be provided for each leg operatively connected to the central component, and each leg detached from the central component and attachable to an attachment plate by a plurality of fasteners. The attachment plates may be extraneous structures, or may be part of a polygonal (e. g. triangular) shape of the central tubular component.

The VAWT may have particularly designed spokes, for ease of manufacture. According to this aspect there is provided a VAWT spoke curved along a dimension of elongation having a slot substantially along the dimension of elongation for receipt of a vane, the slot open at the free end of the spoke, and closed adjacent the hub of the spoke; and a fastener-receiving opening adjacent the free end of the spoke, which is capable of cooperating with a fastener to hold a vane in the slot.

It is a primary object of the present invention to provide a simple yet effective way to remove carbon dioxide from the air while producing useful materials from it, and preferably while also performing other useful work. (However, the mounting system and wind turbine of the invention may also be used for other purposes). This and other objects of the invention will become clear from an inspection of the detailed description of the invention, and from the appended claims.

DETAILED DESCRIPTION OF THE DRAWINGS

Figure 1:
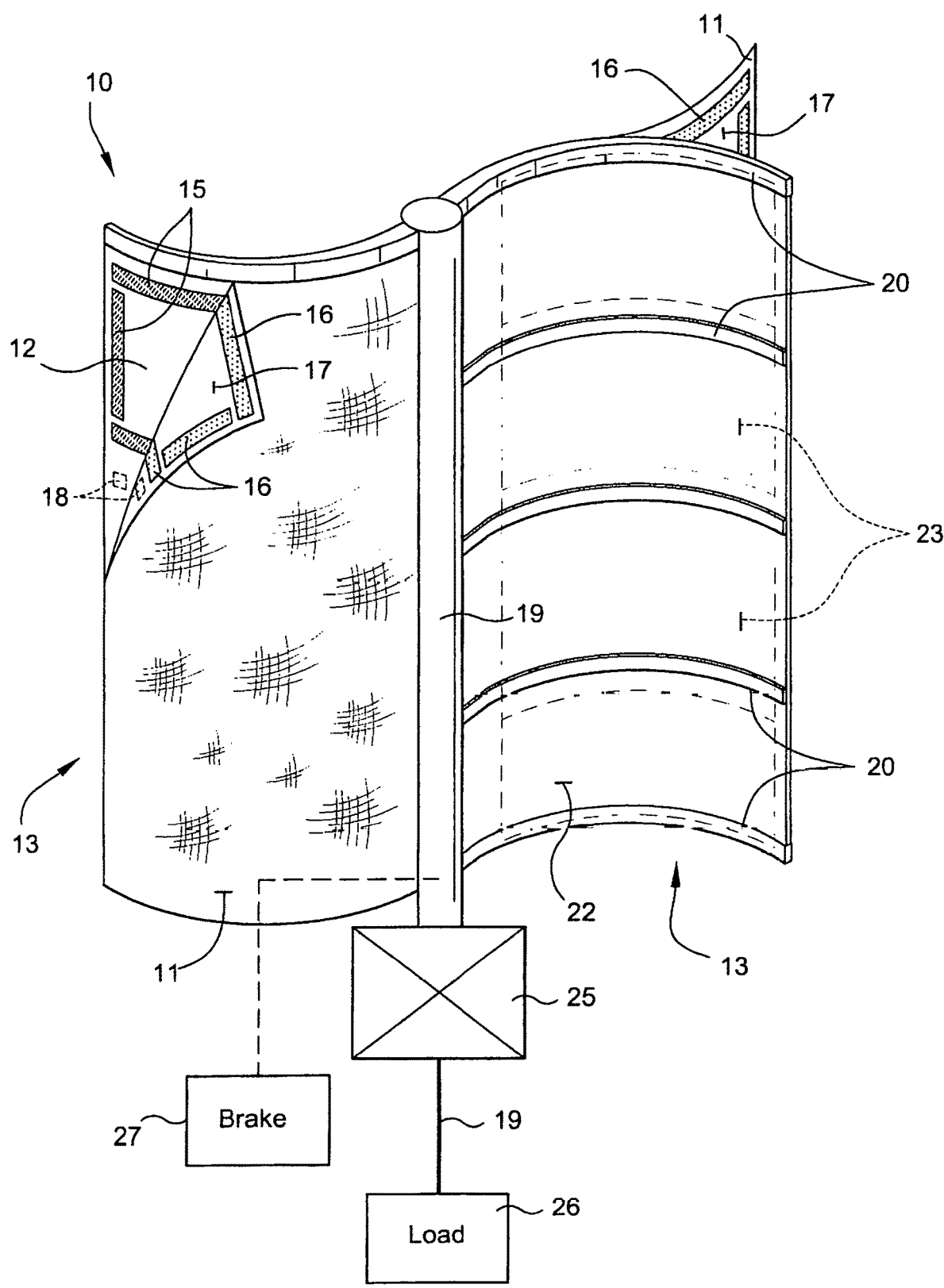
FIG. 1 is a schematic perspective view of one form of a Savonius vertical axis wind turbine rotor that can be utilized to practice the invention.

FIG. 1 is a schematic perspective view of one form of a Savonius vertical axis wind turbine (VAWT) rotor 10 that can be utilized to practice the method of the invention, and comprise at least part of the apparatus of the invention. The rotor 10 may be generally like those illustrated in co-pending U.S. Pat. No. 7,314,346 or U S Patent Application Publication 2006/0153682, but utilizing the particular materials of the rotor surfaces according to the invention. While a Savonius type rotor 10 is preferred other types of VAWTs not classically considered Savonius rotors—such as open helix turbines, and those in U.S. Pat. Nos. 2,677,344 and 4,359,311—may also be utilized. In fact any wind turbine having a relatively large vane surface area which allows carbon dioxide removal as according to the invention may be employed, including horizontal axis wind machines (such as Dutch four-arm, or Portuguese sail, wind machines).

FIG. 1 illustrates a two vane rotor 10, but it is to be understood that the invention is also applicable to three vane, four vane, or other VAWTs. The rotor vanes (sometimes called "blades") 13 have removable coverings 11 for the exterior (wind-spilling) surfaces 12 thereof. The removable coverings 11 are preferably some sort of fabric, including woven, nonwoven, knit, and mesh materials, which support a $CO_2$ removing material. While many different types of yarns, threads, or fibers may be utilized for the coverings 11, preferably they are of organic or other biodegradable material, such as cotton, hemp, flax, ramie, sisal, wool, silk, kenaf, coconut, and/or jute. The fabrics forming the coverings 11 have potassium and/or nitrogen containing compounds associated therewith which are capable of reacting with ambient carbon dioxide to remove it from the air and ultimately form a material capable of use as a fertilizer. Non-limiting examples of potassium and/or nitrogen containing compounds include potassium superoxide, potassium hydroxide, potassium carbonate, and ammonia. The removable coverings may be wash coated, impregnated, solution coated, irradiated, plasma treated, chemically acted upon, or otherwise treated so that they have the desired potassium and/or nitrogen compound or compounds associated therewith.

In one example, a woven cotton fabric is passed through an at least five molar solution of KOH, passed through conventional squeeze rolls, air dried, and the process repeated until a desired molarity of KOH (e. g. five moles) is provided associated with the fabric. Generally the higher the molarity of the material associated with the fabric, the more carbon dioxide it can remove before being saturated.

In another example, a non-woven fabric of kenaf and hemp fibers is dipped by hand (the wearer preferably wearing surgical gloves and a paint mask or respirator) in a solution of KOH and hung on a rack to drip dry over a trough, with the excess KOH collected and reused. The dipping and drying procedures may be repeated as desired.

While the coverings 11 preferably are fabric, any material capable of being impregnated, coated, or otherwise associated with potassium and nitrogen compounds capable of removing carbon dioxide from the atmosphere may be utilized.

The coverings 11 are preferably made readily detachable from the rotor 10, such as by using cooperating hook and loop (e. g. VELCRO) fasteners 15, 16 on the exterior surfaces 12 of the vanes 13, and the interior surfaces 17 of the coverings 11, respectively. For example the fasteners 15 may be hook fasteners (e. g. of stainless steel or nylon), and the fasteners 16 loop fasteners (of any suitable conventional material compatible with the coverings 11 and potassium and/or nitrogen compounds associated therewith). The fasteners 15 may be attached by adhesive, welding, etc. to the surfaces 12, and the fasteners 16 attached by sewing, adhesive, or other conventional manner, to coverings 11.

Figure 9:
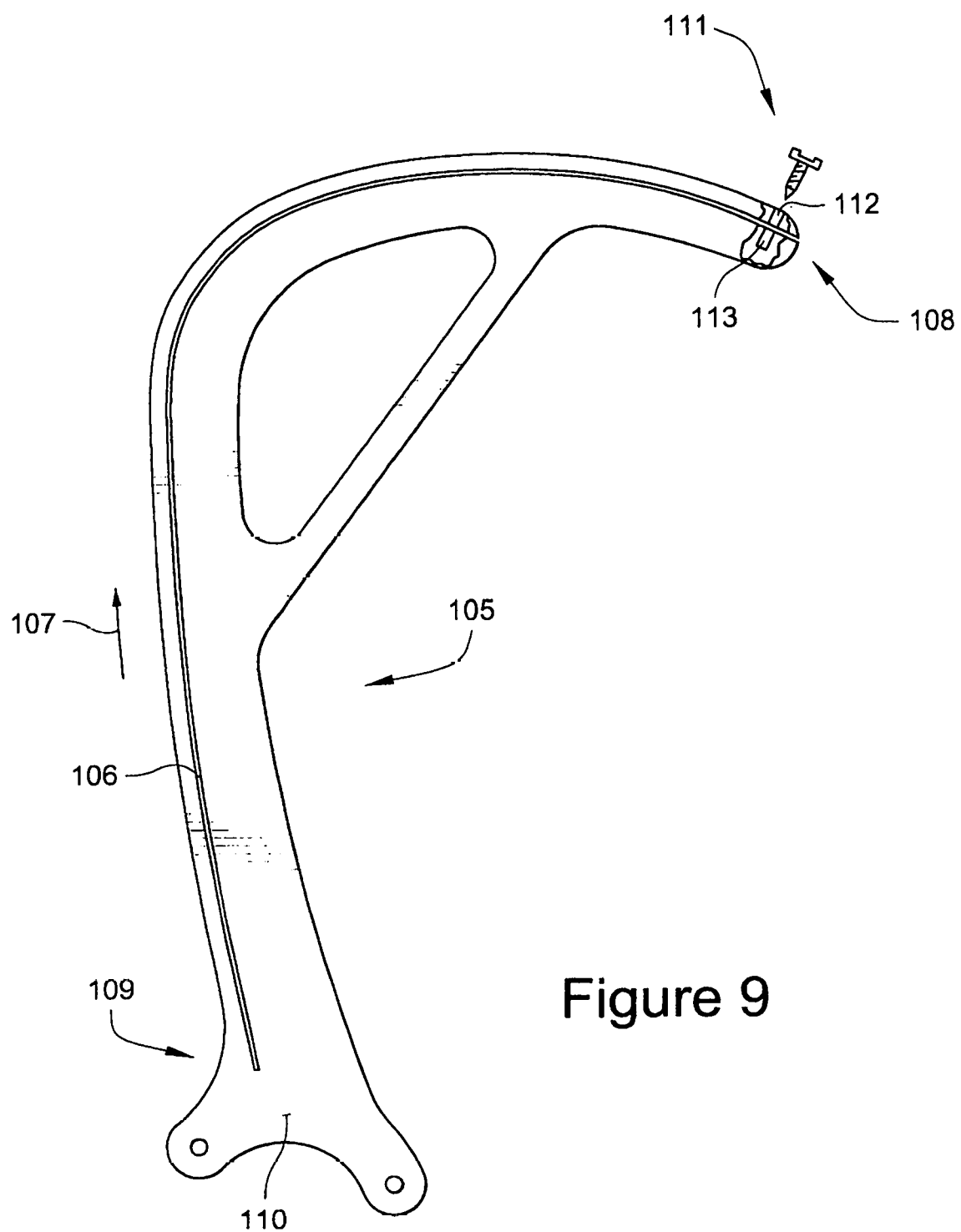
FIG. 9 is a top plan view of an alternative spoke configuration for a three bladed VAWT with the free end partly in cross section.
Figure 10:
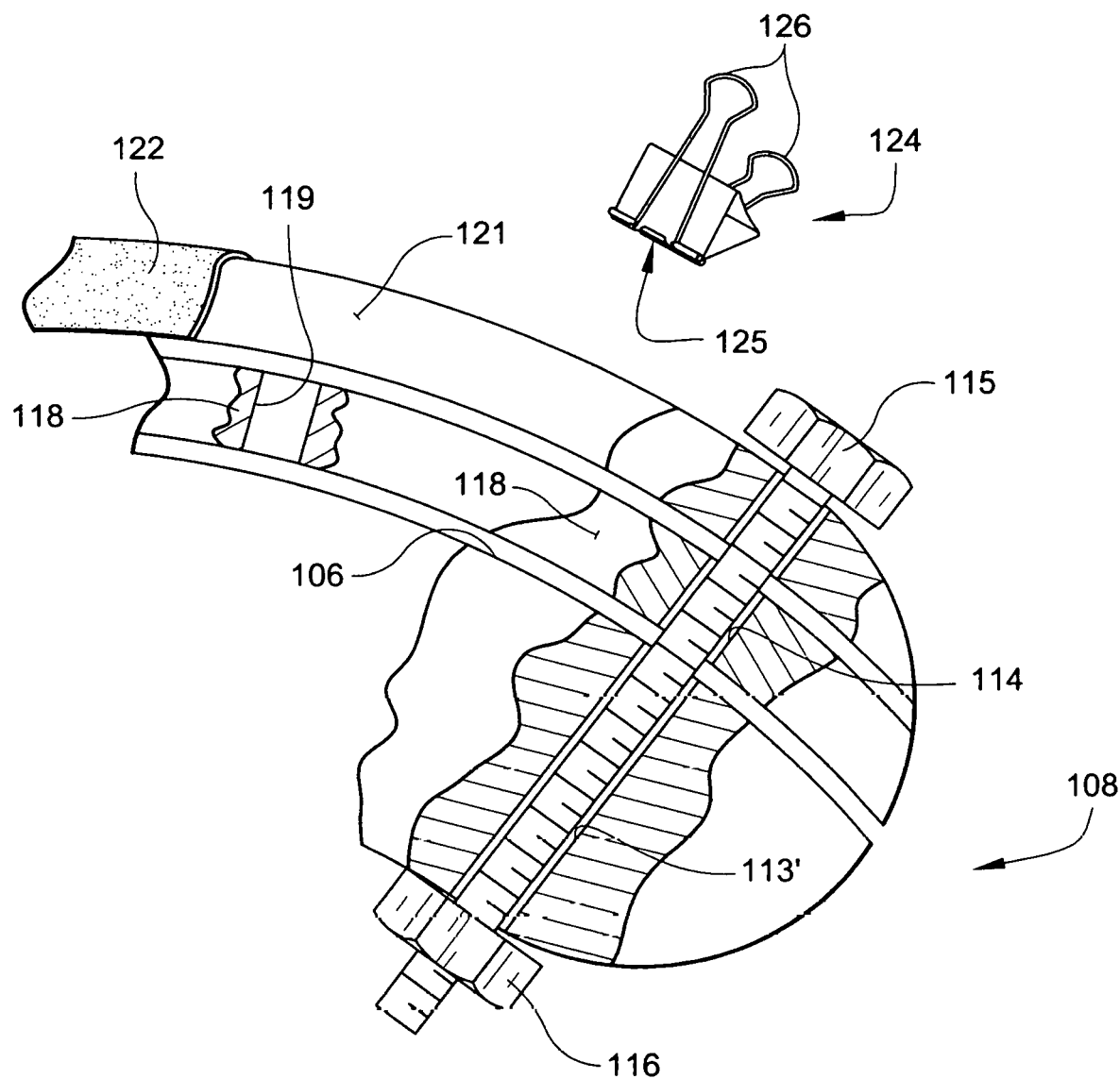
FIG. 10 is a significantly enlarged top cross-sectional view of just the free end of the spoke of FIG. 9 with a slightly different configuration, and showing a vane/blade fixed thereby.

While hook and loop fasteners 15, 16 are particularly desirable, other types of conventional or hereafter developed fastening systems may alternatively, or in addition, be used. For example strips or blocks of magnetic fasteners (shown schematically in dotted line at 18 in FIG. 1), snaps, or the like may be used. Or a removable adhesive may be applied to one or both of the coverings 11 and the surfaces 12 which is strong enough to hold the coverings 11 in place during operation, but may be relatively easily removed when desired. The coverings may also at least partially wrap around at least some of the spokes (also known as ribs) 20 supporting the vanes 13 (as in FIGS. 35, 36 and 46 of U.S. application Ser. No. 10/443,954 filed May 23, 2003). Alternatively, especially where the spokes of FIGS. 9 & 10 are utilized having a portion sticking out from the exterior of the vanes 13, conventional binder clips (such as shown in any Figure of U.S. Pat. No. 7,305,741) may be utilized to hold the coverings 11 on the spokes 20.

The spokes 20 and vanes 13 may be of any suitable material that does not adversely affect, or is not adversely affected by, the chemicals of the coverings 11. For example the vanes 13 may be of polycarbonate, and the spokes 20 (or 105 in FIGS. 9 & 10) of steel. The spokes 20 may be aluminum, but since aluminum will adversely react with potassium hydroxide, if KOH is used, conventional polyester film self-adhesive tape strips, a plastic coating, or a coating of another suitable material (as in U.S. Pat. No. 4,189,531), may be adhesively attached to, or brushed on and allowed to dry, on those portions of the spokes 20 (or any other aluminum component) that will come into contact with the KOH.

The coverings 11 are shown in FIG. 1 as applied to the exterior (wind-spilling rather than wind-driven) surfaces 12 of the rotor 10 since often those surfaces usually are not as harshly acted upon by the wind as the rotor 10 is rotated about a substantially vertical axis defined by central shaft/mast 19, yet plenty of wind will still come in contact therewith. However if desired, the $CO_2$-reacting material may be provided alternatively, or in addition, on the wind-driven surfaces 22 of the vanes 13. For example, as illustrated in FIG. 1, panels—shown in dotted line at 23—may be applied to surfaces 22 between ribs 20, e. g. using fasteners or readily removable adhesive. The panels 23, like the coverings 11, have a potassium and/or nitrogen compound associated therewith capable of reacting with $CO_2$ to produce a fertilizer. Alternatively coverings substantially identical to the coverings 11 may be applied to the surfaces 22 and held in place by conventional binder clips clamping the coverings to the ribs 20.

The shaft 19 is mounted in one or more conventional bearings 25, and the wind turbine rotor 10 provides mechanical force when driven by the wind. A conventional mechanism and/or procedure are provided for utilizing that mechanical force to perform useful work. For example the shaft 19 is operatively connected to a generator (e. g. to run a dc or ac appliance, or to charge a battery), pump, propeller, or compressor 26, or any other type of force utilizing mechanism.

It has been found that when chemical containing fabric like the coverings 11 is mounted for movement on a wind turbine that the reaction with $CO_2$ is facilitated. Also, since the reaction may be facilitated even more if both sides of a covering 11 are exposed to substantially ambient air containing $CO_2$, the vanes of the wind turbine may consist essentially of the coverings 11; or the vanes 13 may be perforated (as seen in FIG. 10). Normally the last thing one would do is perforate a vane of a wind turbine since that might adversely affect its efficiency, but in view of the multi-functional nature of the wind turbines according to the invention, that may be desirable.

In order to facilitate changing of the coverings 11, panels 23, etc., once they have substantially completely reacted with $CO_2$, a conventional brake 27 may be used to prevent rotation of the rotor 10 during covering 11 replacement. Any conventional brake 27 may be utilized, such as a Dexter trailer disc brake K71-651-00.

Figure 2:
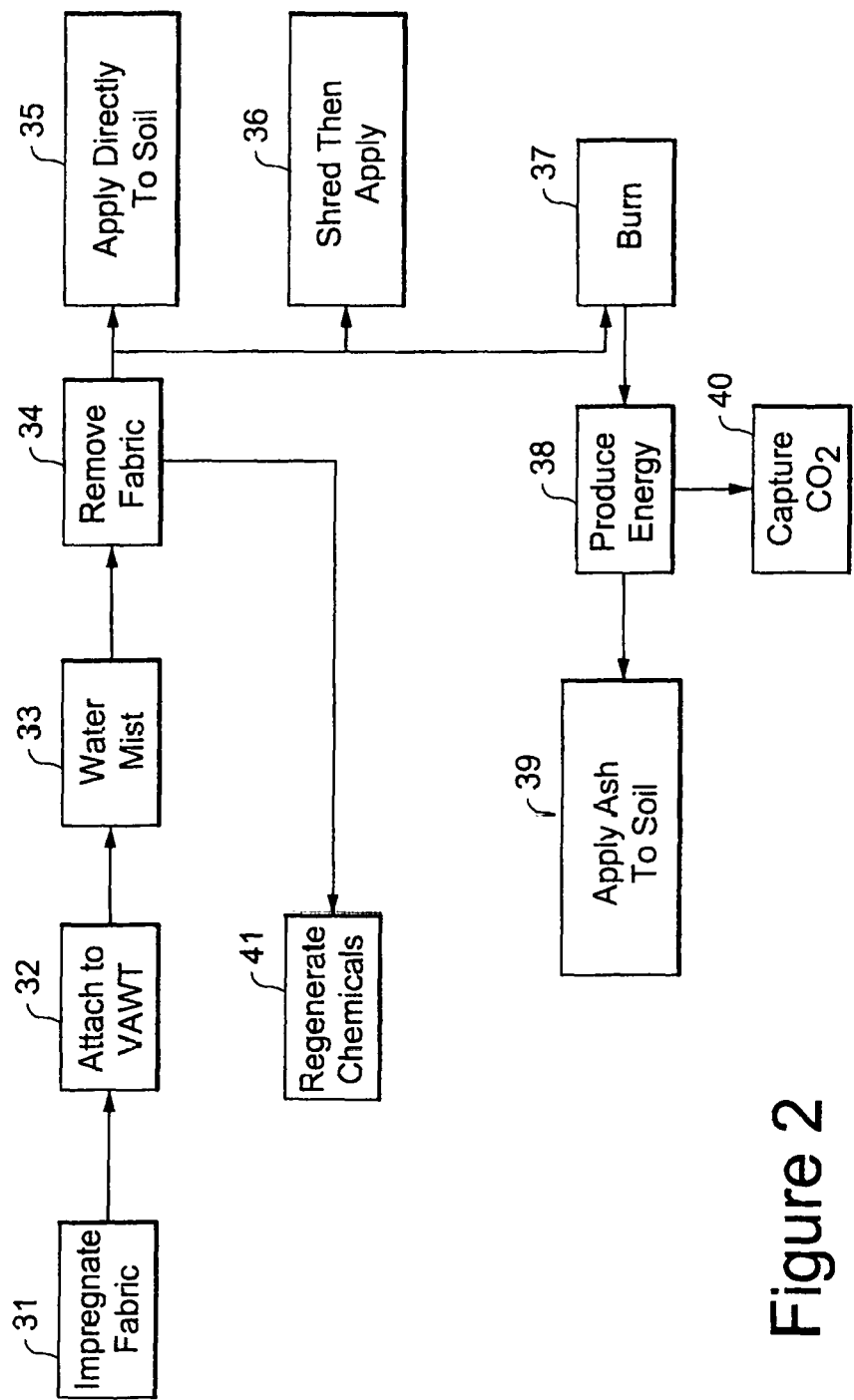
FIG. 2 is a box diagram of an exemplary method according to the present invention.

FIG. 2 schematically illustrates an exemplary method according to the invention. In the first procedure, illustrated at 31, one piece of fabric is impregnated or otherwise associated with potassium hydroxide, potassium superoxide, and/or potassium carbonate, and another piece of fabric is impregnated with ammonia; or the same piece of fabric may be impregnated with both $NH_3$ and KOH (or other suitable nitrogen and potassium-containing compounds). The fabrics form coverings 11 which are then attached—schematically illustrated at 32—to vanes 13 of a VAWT, such as the two vane Savonius rotor 10 of FIG. 1, as by hook and loop fasteners 15, 16, binder clips, etc.

Where necessary, as indicated at 33, water mist is sprayed (preferably periodically or intermittently, but under sometimes substantially continuously) in the path of movement of the vanes 13 so that the fabric passes through the mist and stays reasonably hydrated. This maintains conditions reasonably optimized for the desired chemical reactions (understanding that it is not possible to fully control the environment).

After the fabrics have been exposed to the atmosphere for a sufficient period of time, the reactive original materials therein have been changed to carbonates, such as potassium carbonate, potassium bicarbonate, and/or ammonium bicarbonate. The carbonates can be effective fertilizers. The fabrics are ultimately removed from the vanes 13 of the wind turbine rotor 10, as indicated at 34 in FIG. 2. From there, the fabrics may be applied directly to the soil (especially if the fibers of the fabric are easily biodegradable) as by being buried, or used basically as a geotextile fabric, as schematically indicated at 35. Alternatively, the fabric may be shredded—as indicated at 36—using conventional shredding equipment (such as simple spiked or knife rollers as in U.S. Pat. No. 4,296,168, or in a conventional wood chipper), and then applied to soil.

As yet another alternative, the fabric may be burned in a conventional combustion chamber 37 while producing process heat, electricity, or other energy (as indicated at 38), and the resulting ash 39 used as fertilizer. This last procedure is less desirable if the majority of a piece of fabric comprises potassium bicarbonate since carbon dioxide would be liberated before the combustion temperature for the fabric was reached. In any event, carbon dioxide may be captured—as illustrated at 40 in FIG. 2—from the energy producing stage 38 and otherwise sequestered or used in industry.

In any of the cases 35, 36, 39, preferably one or more pieces of fabric having both ammonium bicarbonate and either or both of potassium carbonate and potassium bicarbonate are handled together, producing the ultimate fertilizer applied in 35, 36 or 39. That way two of the three major nutrients for most plants (nitrogen and potassium) are provided. The K and N of the fertilizer are turned into ions in the soil, and taken up by plants. Many plants will also take up about 10% of the carbon in the carbonates, and up to about 70% of the rest of the carbon in the carbonates—depending upon soil conditions like pH and the predominance of calcium and magnesium—will form very stable carbonates that remain in the soil essentially forever, sequestering the majority of the carbon in the carbon dioxide that was removed from the atmosphere.

For example where a two vane Savonius is the VAWT (see the rotor 10 in FIG. 1 for example), the covering 11 on one vane 13 will be fabric having KOH associated therewith. The covering 11 on the other vane 13 will be fabric having $NH_3$ associated therewith. For example in both cases the fabric may be a cotton mesh. Thus when the coverings 11 are removed at 38 they can be processed together, and one will supply potassium to the soil, and the other nitrogen.

If desired plant micronutrients, such as copper, iron, and manganese, can be added to a chemical bath at 31 used to impregnate the fabric. When the fabric is then placed in soil these micronutrients will be available to plants.

As an alternative to the procedures 35, 36, 39, the starting materials can be regenerated. For example, potassium carbonate may be reacted with calcium hydroxide—as indicated at 41—to produce KOH and calcium carbonate. The potassium hydroxide is then used to impregnate other fabric, and the calcium carbonate may be employed for one of its conventional uses. Alternatively, the calcium carbonate may be used to regenerate calcium hydroxide, but this releases carbon dioxide, which then must be sequestered in another manner (so that it is not released into the atmosphere), or used in industry.

Figure 3:
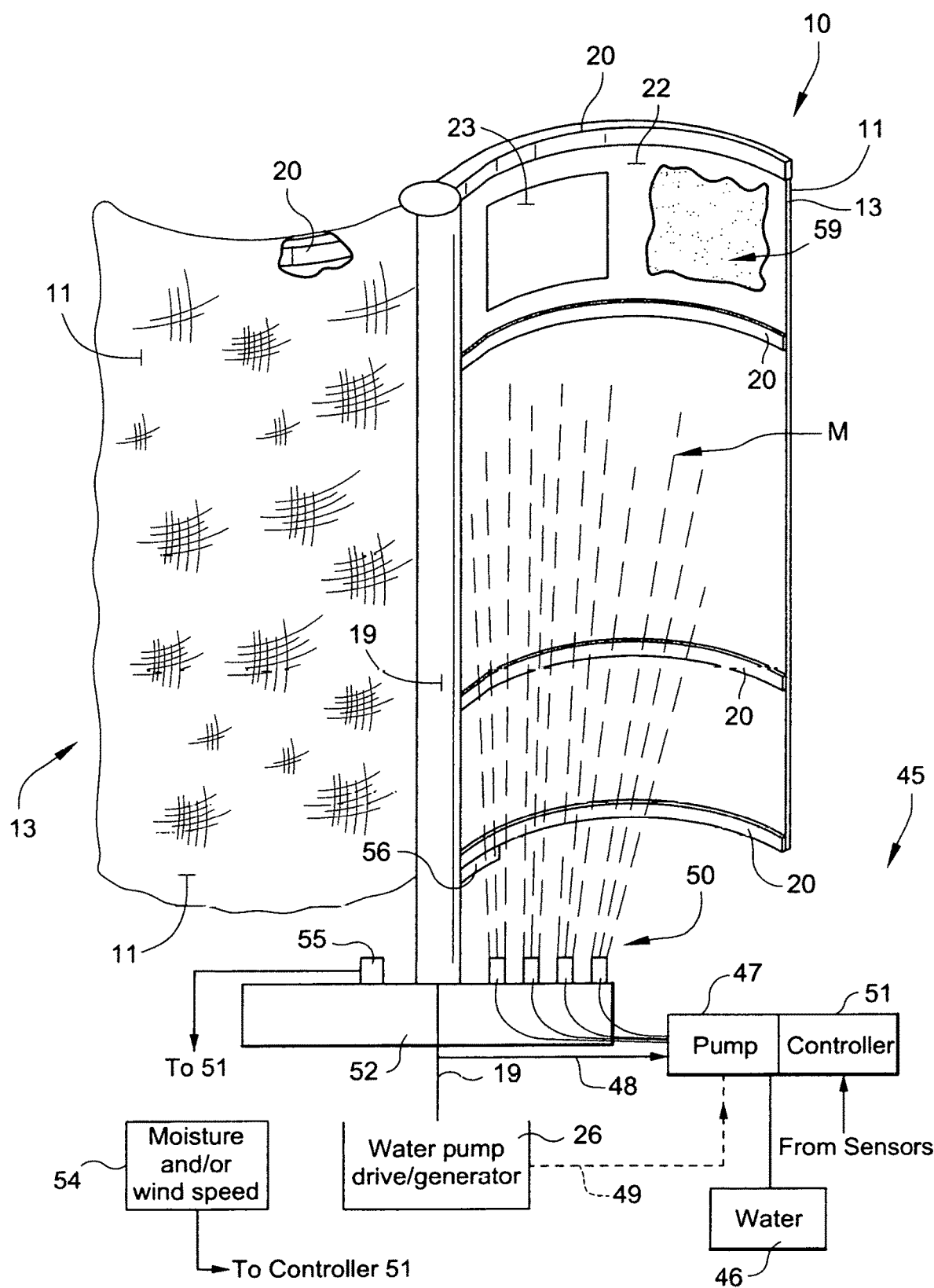
FIG. 3 is a view like that of FIG. 1 showing a modified form of VAWT rotor, and in association with one exemplary embodiment of a mist applying system according to the invention.
Figure 4:
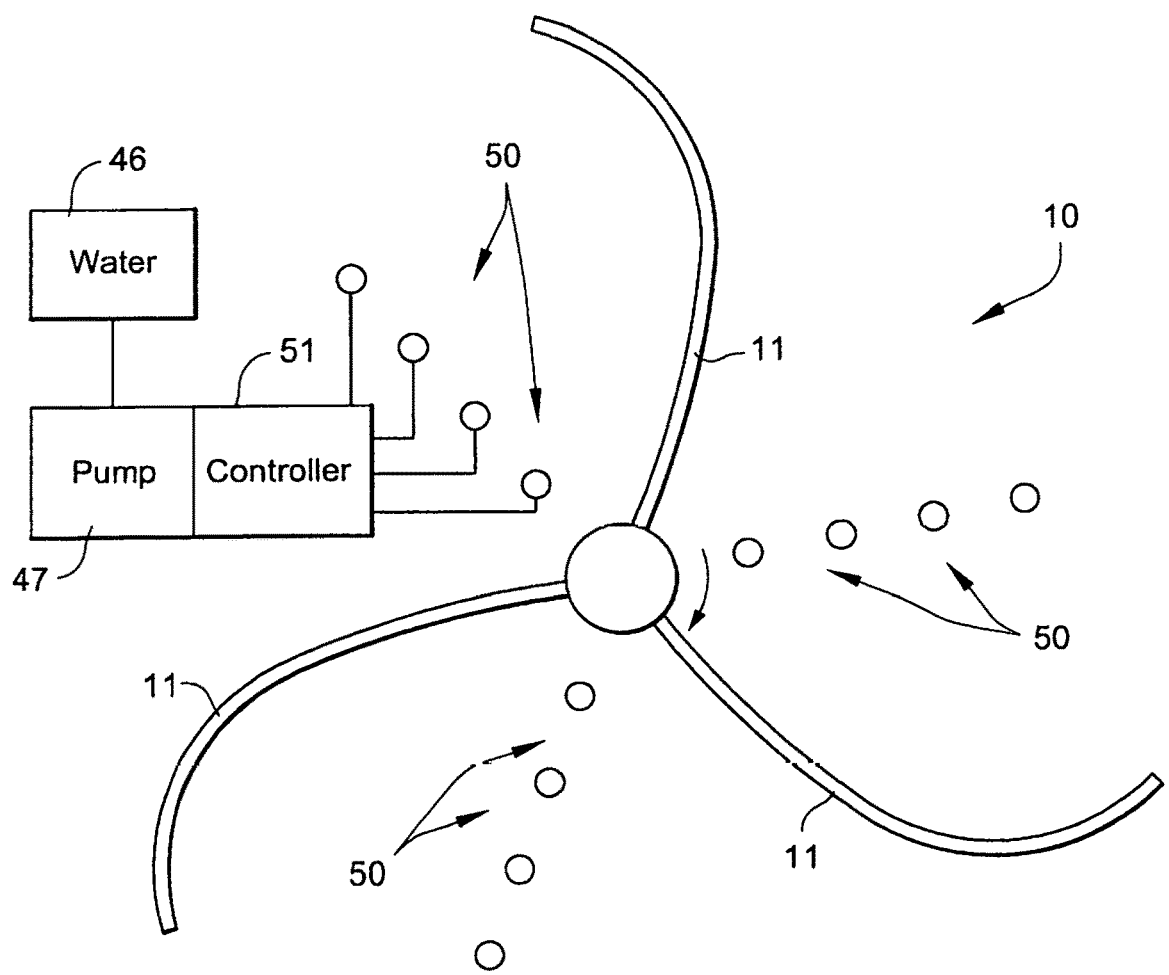
FIG. 4 is top schematic view of modified versions of the rotor and mist applicator of FIG. 3.
Figure 5:
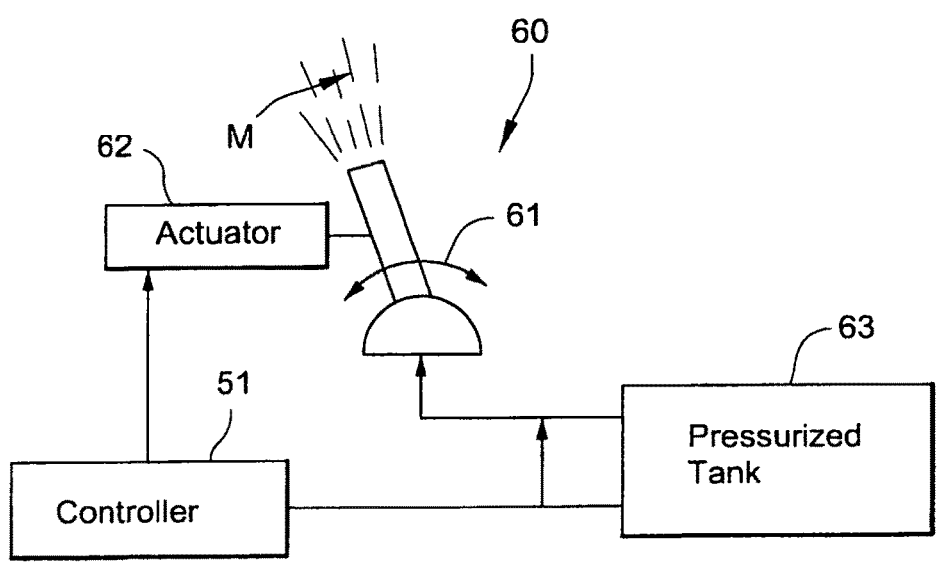
FIG. 5 is schematic illustration of another form the mist applicator may take.

FIG. 3 is a schematic isometric view of another exemplary VAWT 10 according to the invention, this one with a misting system, shown generally at 45. [Structures in FIGS. 3 & 4 comparable to those in FIG. 1 have the same reference numerals]. The misting system 45 includes a source of water (which may include other materials besides pure water to facilitate $CO_2$ removal, or plant micronutrients) 46 and a pump 47. The pump 47 may be driven directly by the shaft 19 of the VAWT 10, as indicated by line 48 in FIG. 7. Alternatively, the pump 47 may be an electrical pump and may be driven by a generator 26 (in turn powered by the VAWT shaft 19), as indicated by line 49; or the pump 47 may be powered by batteries, or a connection to the grid, or in any other conventional manner.

Mist application is practiced by one or more nozzles 50 operatively connected to the pump 47 and preferably controlled by a conventional electronic controller 51. The nozzles 50 may be of any desirable conventional construction. The controller 51 may control the pump 47, the nozzles 50, or both. Control may be effected to periodically, intermittently, substantially continuously, or in any other manner, control the supply of water as mist (shown schematically at M in FIG. 3) from the nozzles 50 so as to wet the removable coverings 11 having the $CO_2$ reacting chemicals associated therewith. The nozzles 50 are preferably stationarily mounted to a frame, shown schematically at 52 in FIG. 3, in turn mounted to the ground. The frame 52 may contain a bearing (like 25 in FIG. 1) facilitating rotation of the shaft 19, or may be completely independent of the shaft 19. The nozzles 50 are sufficient in number, position, and orientation, so that the vast majority of the coverings 11 have mist M applied to them as they rotate into contact with the mist M sprayed generally upwardly by the nozzles 50.

While for simplicity it is desirable to position the nozzles 50 so that they are stationary and mounted close to the ground, if a particularly large turbine is utilized, or under other conditions, it may be desirable to provide misting nozzles at the top of the turbine, and/or even at intermediate points. Under some circumstances, where labor is cheap and/or ambient conditions normally supply sufficient moisture, misting may be accomplished manually when necessary, such as by using a misting nozzle on a hose connected to a movable pressurized water tank.

One way that the controller 51 may operate is to operate the pump 47 and/or control the nozzles 50 only under certain conditions, as determined by one or more sensors. For example, a conventional sensor 54 may be provided to sense moisture in the atmosphere (e. g. humidity, or actual rain), and/or sense wind speed. For example if the sensor 54 senses a threshold of relative humidity has been exceeded (e. g. 40-85%). or a threshold wind speed has been exceeded (e. g. 25 mph), the controller 51 will turn off the pump 47 and/or nozzles 50 so that no mist M is generated. Or if wind speed is too low (e. g. less than 5 mph) the controller 51 will retard or interrupt mist application.

Alternatively, or in addition, another sensor 55 may be provided to control the timing of misting relative to the position of the coverings 11. For example a magnet 56 mounted on the bottom of one of the vanes 13 of the VAWT 11 is sensed by sensor 55 which then tells the control 51 when to activate mist application. The position of the sensor 55 with respect to the coverings 11 is known and the rpm of the VAWT can also be determined in a conventional manner, thereby controlling the nozzles 50 to apply mist M exactly at the right time for the coverings 11 to be moistened. Alternatively or in addition, the wind speed data sensed by sensor 54 may be integrated with the position sensor 55 data to determine optimum activation of the misting nozzles 50.

Other control elements, such as timers, etc., may also or alternatively be utilized so that misting only occurs at particular times or intervals. Also other or additional mechanisms may be provided for supplying a mist, such as disclosed in FIGS. 11 and 17 of U.S. Pat. No. 7,098,552.

The FIG. 3 embodiment also shows some other modifications of the invention. For example, the left hand "covering 11" is in actuality not a covering for a vane 13, but is a covering for the vane ribs 20 (as shown in the one cutout at the top) and thus actually provides the wind driving surface of the rotor 10. This covering 11 may be attached to the ribs 20 in any suitable manner, as by wire ties, binder clips or similar clamping devices, adhesive, or other conventional mechanisms.

FIG. 3, on the right side, also shows chemical 59 (e. g. KOH or $NH_3$) applied directly to the interior surface 22 of the vane 13, as with an adhesive which subsequently can be removed. A water or other spray can be used to remove the chemical 59 once it has substantially fully reacted with ambient carbon dioxide, and then the water from the spray is collected using a pan or the like at the bottom, and then applied to soil, the water having potassium and/or nitrogen fertilizer therewith.

The FIG. 3 embodiment shows only one set of nozzles 50, and a two bladed Savonius VAWT 10. However as indicated above a wide variety of other types of VAWTs (indeed other types of wind machines in general) may be utilized, and a plurality of sets of nozzles 50 may also be utilized. For example, FIG. 4 is a schematic top view of a three vane Savonius rotor 10 in association with three sets of nozzles 50. All sets of nozzles 50 may be controlled by the same controller 51 and supplied with water by the same pump 47 and water source 46, or different pumps 47 may be utilized for the different sets of nozzles 50 (although desirably a single controller 51 is utilized).

FIG. 5 is a schematic view of an alternative misting system that may be used in the embodiments of FIGS. 3 and/or 4. In the FIG. 5 embodiment, a single misting nozzle 60 is utilized. Nozzle 60 is mounted for movement—pivotal movement in the embodiment illustrated as indicated by arrows 61—to change the direction of the mist M emanating therefrom. An actuator 62 (a conventional linear actuator is illustrated) pivots the nozzle 60 as indicated by arrows 61 to control the direction of the mist M under the control of the controller 51. The water for misting is supplied by a conventional pressurized tank 63, which is recharged when necessary by a pump (not shown). The controller 51 controls the tank 63 to not only determine when water for misting is supplied from the tank 63 to the nozzle 60, but also to determine the pressure of the supplied water. In that way not only will the direction of the mist M from the nozzle 60 be controlled but so will how far the mist M travels and/or the amount of mist M.

While pivotal movement of nozzle 60, and a linear actuator 62, are illustrated in FIG. 5, it is to be understood that any type of movement, and any type of conventional actuator, may be utilized which achieve the desired end result of substantially optimizing the moisture conditions of the coverings 11 to substantially optimize the amount and/or rate of $CO_2$ removal from moving ambient air. Normally the ambient air should have at least about a 40-50% relative humidity in order to provide sufficient moisture for the desired reactions changing potassium superoxide or potassium hydroxide to potassium carbonate and/or potassium bicarbonate, and ammonia to ammonium bicarbonate.

While the invention is most desirable where the potassium and/or nitrogen compounds are provided on a wind turbine rotor, they may be in general placed in any suitable position in ambient airflow (such as in a prevailing wind off a lake or mountain), using any suitable structure (such as a frame, rings, existing structure, etc.).

FIGS. 6-8 show versions of a desirable mounting system 67 for a turbine 10 according to the invention. The mounting system 67 is relatively easy to manufacture, use and transport, is versatile, and facilitates installation and removal of coverings 11.

In FIG. 6, the rotor 10 includes a substantially vertical (in operation) mast/shaft 19 similar to the shaft 19 in FIG. 1, operatively connected to the vanes 13. In the preferred embodiment illustrated in FIG. 6, the mast 19 is hollow and fits over a substantially vertical (in operation) driven shaft 14 of a mounting system 67 according to the invention. The shafts 14, 19 are preferably of very corrosion resistant material, such as aluminum, stainless steel, or carbon fiber. The shaft 14 must be made of a particularly strong material (such as 7075 aluminum alloy). While any suitable substantially permanent or removable operative connection may be provided between the shafts 14, 19, in the preferred embodiment the shafts 14, 19 are operatively connected by a quick connect/disconnect pin coupling 65, such as McMaster Carr Part No. 98480A013, which can pass through cooperating aligned openings (not shown) in the shafts 14, 19. However any suitable conventional quick connect/disconnect may be utilized.

While the invention is not limited by dimensions, one particular desirable unit according to the invention is provided when the rotor is about 2.4-2.5 meters high and slightly less than one meter in diameter. This allows easy access to the coverings either using a ladder, or tilting the entire turbine 10 so that it is substantially horizontal.

The mounting system 67 further comprises a substantially tubular central component 68 which is substantially concentric with the shaft 21. Conventional bearings—not shown in FIG. 6 but illustrated schematically at 25 in FIGS. 7 & 8—such as double sealed bearings, are provided between the inner surface of central component 68 and driven shaft 14 to provide for rotation of the shaft 14 and rotor 10 about a substantially vertical (in operation) axis defined by the central component 68.

The central component 68 is supported in a very versatile manner, allowing the rotor 10 with coverings 11 to be easily, yet securely and effectively placed almost anywhere. At least three (and preferably only three) support legs 69 are provided operatively connected to the central component 68 and extending downwardly therefrom at an angle α with respect to the horizontal. The angle α is preferably about 35-55 degrees (e. g. about 45 degrees).

At least one, and preferably all, of the support legs 69 is/are telescopic. In the embodiment illustrated the legs 69 each have a substantially hollow main portion 70 operatively connected (e. g. welded, connected by bolts, adhesively connected, etc.) to the central component 68, and a telescoping portion 71 which slides in and out of main portion 70 to adjust how far the remote end 76 of the telescoping portion 71 is from the central component 68. While the hollow interior of the main portion 70 and the exterior of the telescoping portion 71 may be circular in cross-section, it is preferred that they are polygonal in cross section (e. g. square, as shown in the drawings). While the portion 71 may be substantially solid, it is preferred that portion 71 is also substantially tubular.

Each main portion 70 preferably has at least one (e. g. a single) opening 72 which can be aligned with any one of the plurality of openings 73 in the telescoping portion 71. Preferably a quick connect/disconnect coupling is provided between the portions 70, 71 allowing the relative positions thereof to be adjusted, such as the coupling pin 65', which is substantially identical to the coupling pin 65 except for dimensions.

Figure 6:
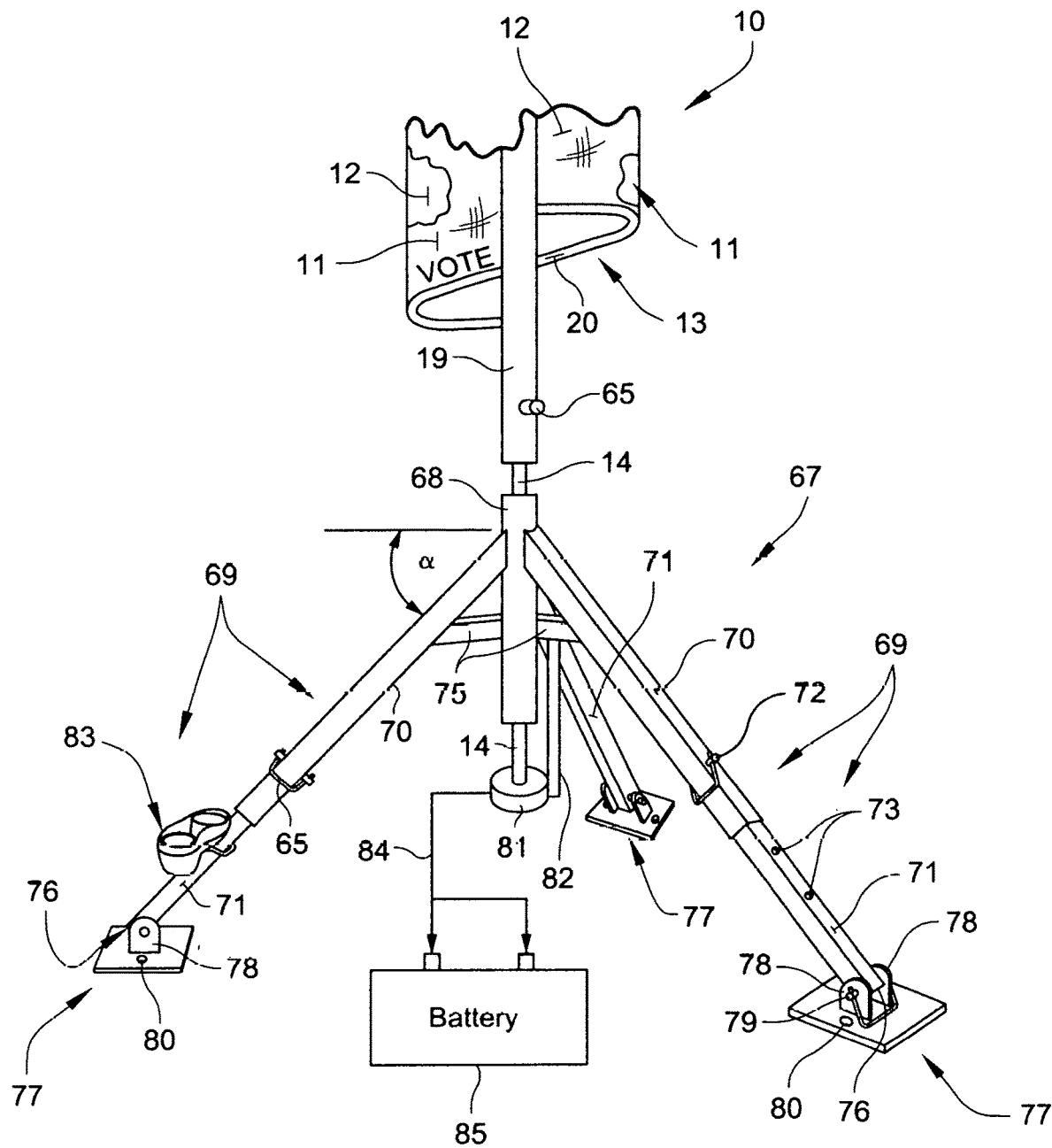
FIG. 6 is a perspective schematic view of a mounting system for a wind turbine utilized in the practice of the invention.

While it is preferred that there be a plurality of discrete adjustment positions defined by openings 73, and a quick connect/disconnect coupling 65' be utilized, instead the components 70, 71 can be threaded together to provide substantially infinite adjustment (over the threaded length) with one or more set screws or other conventional locking mechanisms provided to hold the components 70, 71 in place in the position to which they have been adjusted. A wide variety of other arrangements can alternatively be provided to provide for individual adjustment of the effective length of each of the legs 69 so that the system 67 can be mounted on almost any terrain.

Where necessary to properly support the legs 69, the support elements 75 are provided extending between the leg main portions 70 and the central component 68. The support elements 75 may be—as illustrated in FIG. 6—cross bars, or may be gussets or other conventional components, and may be welded, bolted, or otherwise attached to the components 68, 69. Preferably all of the components 68, 70, 75 are made of strong, corrosion-resistant, compatible materials, such as all made of anodized aluminum. In fact it is desirable that all components of the system 67 be made of strong corrosion resistant materials, such as anodized aluminum, stainless steel, and/or carbon fiber.

Also to facilitate positioning on almost any terrain, mounting feet 77 are provided at the remote ends 76 of the leg telescoping portions 71. The feet 77 are movably mounted with respect to ends 76 so that they may adjust to the terrain to which they are ultimately connected. For example ball and socket joints can be provided between fect 77 and ends 76 to allow substantially 360° relative movement. Alternatively—as illustrated in FIG. 6—each foot 77 is mounted for pivotal movement with respect to an end 76 about a substantially horizontal (in use) axis. This is accomplished by providing two spaced vertical ears 78 on each of the feet 77 which can receive the free end 76 of a leg portion 71 therebetween, and a substantially horizontal pivot pin 79 extending through the portion 71 and ears 78 to allow relative pivotal movement therebetween about a generally horizontal axis. The feet 77, ears 78, and pins 79 are preferably made of corrosion resistant material compatible with the leg portions 71, such as aluminum.

The feet 77 facilitate secure anchoring of the system 67. Preferably the feet 77 each have two or more openings 80 therein which receive mechanical elements which positively anchor the system 67 at a particular terrain location. A substantially vertical conventional bolt (which would typically be encased in concrete on a terrain surface), not shown, may extend through each of the openings 80, and a suitable conventional nut threaded over the bolt into contact with the foot 77 (as through a washer) to securely anchor the foot 77—and thus the system 67—to the terrain in which the is mounted.

Another anchoring alternative is steel (or other strong material) spikes (not shown). A spike is positioned in each hole 80 and then driven into the ground, so that the head of the spike abuts the foot 77 and holds it tightly to the ground. The spikes would typically be about ⅓ meter in length. Spikes pounded through each of the openings 80 in all of the feet 77 would securely hold the system 67 in place even in relatively soft terrain, and even when the rotor 10 was subjected to high winds.

Because high winds could tear the rotor 10 or system 67 apart if the rotor were left to "free-wheel", it is important to provide a load to retard rotation of the rotor 10 during high winds. Preferably the load—shown schematically at 81 in FIG. 6—allows desirable rotation of the rotor 10 during normal wind conditions, but prevents or minimizes the possibility of damage to other system components.

As shown in the FIG. 6 embodiment, the load 81 may be mounted to the bottom (in use) end of the driven shaft 14, and may also be mounted to the system 67 by the flange 82.

The flange 82 is affixed to a part of the system 67, such as being welded or bolted to one or more of the leg portions 70, and/or cross supports 75.

If the load 81 is a generator it is connected by conventional wiring or the like to an electrical load. The generator may be a direct drive d. c. generator, although an a. c. generator (alternator), or a geared generator, may be used. One of many examples of a generator is a Shimano Nexus Dynamo HBNX50A33 (available from SJS Cycles).

The electrical load may comprise or consist essentially of one or more lights—shown schematically at 83 in FIG. 6. The lights 83 may be directed toward the coverings 11 (which may have a message thereon—see the word "Vote" in FIG. 6). While a wide variety of different conventional, or hereinafter developed, structures may be utilized, the lights 83 are preferably operated by d. c. current and may be halogen, incandescent, LED, or fluorescent lights, or combinations thereof, in a weather-resistant casing; e. g. a Basta Pilot Halogen Dynamo Headlamp, available from SJS Cycles.

If the load 81 is a generator, although it may be directly connected to lights 83 or another such load (such as a pump or fan), desirably load 81 is connected by wires 84, as seen in FIG. 6, to one or more batteries 85 to charge them. A photosensor, or other type of switching mechanism, may be provided for automatically connecting the batteries 85 to lights 83, or another electrical device, under certain conditions.

The load 81 need not be a generator, but may be a pump, propeller, compressor, or the like. The load 81 slows down the rotation of the rotor 10 during high wind conditions to prevent or minimize the probability of damage. In addition to a load 81, rotation of the shaft 14 may also be retarded by another structure that generally increases resistance to rotation of the rotor 10 as wind speed increases. For example an additional structure could be a centrifugal brake system such as shown in U.S. Pat. No. 4,355,540 or 5,295,562; or a friction disc, such as shown in U.S. Pat. No. 5,543,577; or a speed and torque limiter indirect drive such as shown in U.S. Pat. No. 5,096,035; or a magnetic braking system such as shown in U.S. Pat. Nos. 3,579,003, 5,234,083, 7,264,576, or 7,273,135.

Figure 7:
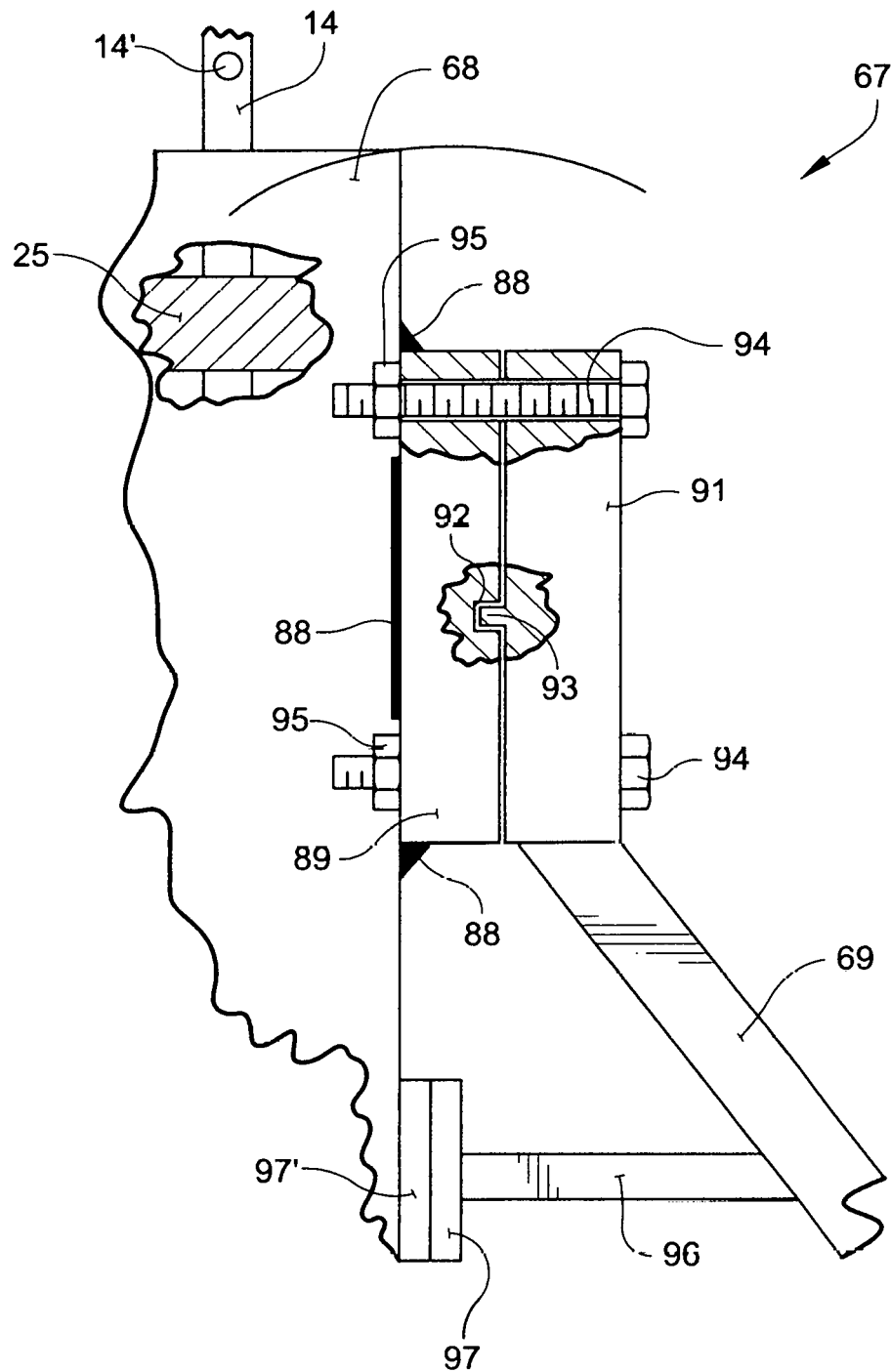
FIG. 7 is a side schematic view, with the central component cut away, of a modified form of the connection of a leg to the central component.

The central component 68 as shown in FIG. 6 is circular in cross-section, but may be polygonal. In the FIG. 7 embodiment components comparable to those in the FIG. 6 embodiment are shown by the same reference numeral. In FIG. 7, desirably substantially flat or slightly curved attachment plates 89—having a width larger than the diameter or width of the central component 68 (and vertically offset if necessary so as not to interfere with each other)—are welded (see welds 88 in FIG. 7) or otherwise securely attached to the central component 68. The driven shaft 14 is mounted by bearings (e. g. 25) within the central component 68 and extends upwardly therefrom, to be pinned (through opening 14') by a quick release fastener 65 to the wind turbine mast 19.

The legs 69 have cooperating substantially flat or slightly curved fastening plates 91 integral therewith (e. g. welded thereto). Fastening plates 91 cooperate with the attachment plates 89. Aligning or interlocking surface manifestations—such as the groove 92 and projection 93—may be provided on the plates 89, 91 to initially and quickly properly position them with respect to each other. Then fasteners 94 hold the plates 89, 91 together. The fasteners 94 may be screws that go through tapped openings in the plates 89, 91 (or at least in the plate 89), or—as shown in FIG. 7—may be bolts held in place by nuts 95. Rivets, lockbolts of a HUCK® fastening system, or conventional quick release fasteners, may alternatively be provided as fasteners 94, 95.

The provision of the plates 89, 91 and fasteners 94-95 allows the mounting system/unit 67 to be shipped in a low volume configuration where the legs 69 are detached from the central component 68, yet the system/unit 67 can be easily and securely assembled at the use location by unskilled labor. The fasteners may be tack welded in place after assembly, if desired. Also, where more support is needed, cross-supports 96, generally like the cross-supports 75, may be welded or otherwise attached to the legs 69 and have a plate 97 at the end thereof which simply abuts the central component 68, or is fixed by conventional fasteners (not shown) to a cooperating plate 97' much like the plates 89, 91 are connected together.

The entire VAWT components of the invention can be shipped disassembled, in a low volume configuration (including the blade/vane material in a roll), and then assembled on site by unskilled labor. Only the central component 68 would desirably be completely assembled prior to shipping.

Figure 8:
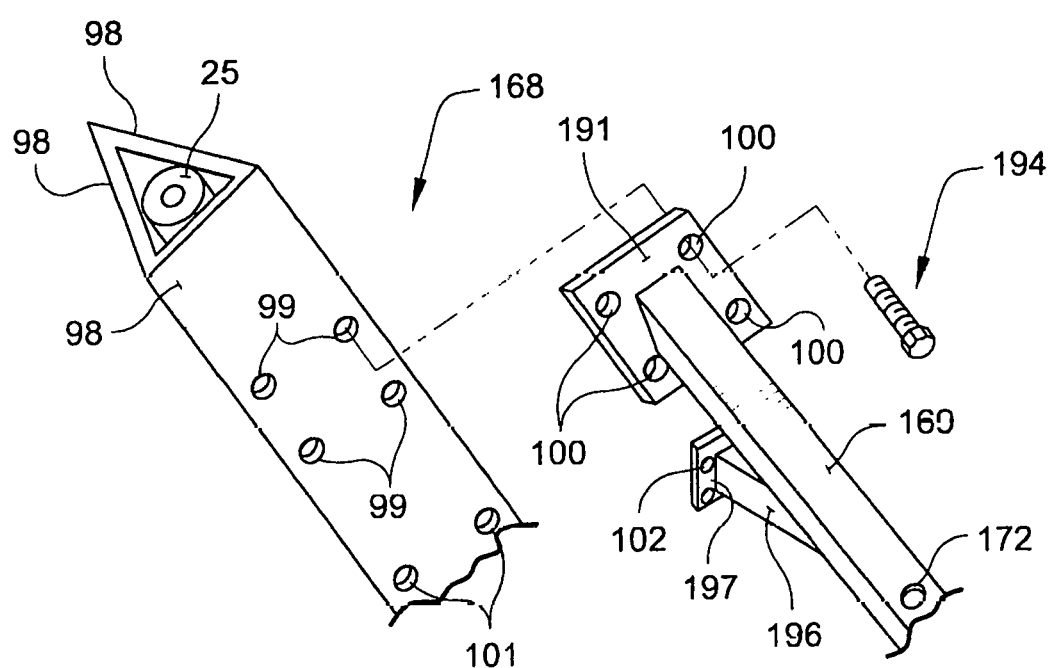
FIG. 8 is a schematic perspective exploded view of a triangular cross-section central component with a leg capable of attachment thereto with fasteners.

FIG. 8 schematically illustrates another embodiment of components of a mounting system according to the invention (components comparable to those in the FIGS. 6 & 7 embodiments are shown by the same two digit reference numeral only preceded by a "1", except that the bearing 25 is substantially identical so it retains its original reference numeral). Non-corresponding structures have new reference numerals.

In the FIG. 8 embodiment the central component 168 is polygonal, preferably triangular, in cross section. Triangular aluminum tubes are available commercially, including from Precision Tube Company of North Wales, Pa., USA. Each of the faces 98 of the central component 168 has a plurality of tapped openings 99 therein for receipt of fasteners 194. The fasteners 194 pass through openings 100 in the plates 191 of the legs 169 and are screw threaded into the openings 99 to hold the legs 169 in place on the central component 168. If necessary, cross-supports 196 may be provided with plates 197 at the free ends thereof, and with fasteners passing through openings 102 in the plates 197 into tapped openings 101 in the central component 168. The openings 99, 101 are formed so that they, and the fasteners that cooperate with them, do not interfere with the bearings 25 or the driven shaft 14 within the central component 168.

In the FIG. 8 embodiment, instead of cross-supports 196 as illustrated, a gusset could extend down from the plate 191 abutting the face 98, with a pair of ears and cooperating holes at the tapped openings 101 to receive screws passing into the openings.

FIG. 9 is a top plan view of a spoke for a three bladed VAWT that under some circumstances can have advantages (such as ease of assembly) over the construction illustrated in U S Publication 2006/0153682. In FIG. 9, the spoke free end is partly in cross-section to show a tapped hole and screw; the two bladed version (as in 2006/0153682) would likely have a slightly different shape. FIG. 10 is a significantly enlarged top cross-sectional view of just the free end of a spoke like that in FIG. 9 with a slightly different configuration, and showing part of the vane/blade fixed thereby.

As seen in FIGS. 9 and 10, according to this aspect of the invention at least some of the spokes 105 of a VAWT are provided with a slot 106 extending along the dimension of elongation 107 of a spoke 105 and open at the free end 108 thereof (while closed at the end 109 thereof adjacent the hub 110). As shown in U.S. Pat. No. 7,314,346 or Publication 2006/0153682, the spoke 105 is curved as it progresses in the dimension of elongation 107, presenting concave and convex surfaces (and of the attached vane/blade 118; see FIG. 10) when the turbine is assembled. The slot 106 has a thickness slightly greater than that of the vane (118).

The spokes 105 may be water jet, or otherwise, cut from aluminum sheet (such as 6061 aluminum), or cut from steel, titanium, or any other suitable material. The polycarbonate, aluminum, or like material blade 118 associated with the spoke 105 passes through the slot 106 (by manually inserting the blade 118 into the slot 106 and related slots on cooperating spokes), and once the turbine is assembled, a screw 111 adjacent the open free end 108 holds the vane/blade 118 in place. The portion 121 (FIG. 10) of the spoke 105 outside of the slot 106 typically extends out from the vane/blade no more than 0.5-3 ems., so us not to significantly interfere with a covering placed thereover, as disclosed in FIG. 1. The spoke 105 itself is usually thin, e. g. 0.5-2 ems. in thickness.

Each screw or other fastener 111 passes through a first opening 112 which may or may not be internally threaded, and then through a pre-formed, or formed by a self-tapping screw 111, opening 114 in the blade 118 (see FIG. 10). The fastener 111 then passes into or through a second opening 113 or 113' on the opposite side of the slot 106 as the opening 112. In FIG. 9 the opening 113 is shown as tapped (internally screw-threaded) and receives a screw 111. In FIG. 10 the opening 113' extends through the spoke 105 and the fastener is a bolt 115, held in place by a nut 116. Alternatively a rivet, a lockbolt pin of a HUCK® fastening system, or a conventional quick release fastener such as the fastener 65, may be utilized instead of bolt 115 and nut 116.

More fasteners 111 can be placed along the length of the spoke 105 to hold the vane/blade 118 to the spoke 105, but typically are unnecessary. A single fastener 111 or 115 for each spoke 105 is normally sufficient.

The vanes 118 may be perforated, as indicated schematically at 119 in FIG. 10, so that wind impacts both sides of a covering (11 in FIG. 1) over the vanes.

Manually positioning the blade 118 in the slots 106 of a set of spokes 105, and fastening a single fastener 111, 115 for each spoke 105, takes roughly half the time of assembling the spoke and blade system of the patent and published application, yet is substantially as secure, or even more secure. The manner of fixing the spokes 105 to other spokes for one or more other vanes, and to a central shaft, of a VAWT are the same as in the patent and published application. If desired the end configuration as shown in FIG. 11 of the published application, or a similar configuration, may be utilized. Where the spokes 105 are aluminum and a covering (11 in FIG. 1) is to be applied thereto including KOH (which degrades aluminum), those portions 121 of spokes 105 exterior of the vanes 118 should be treated to protect the aluminum surface. FIG. 10 schematically illustrates a conventional polyester film self-adhesive tape strip 122 manually applied to the spoke portion 121 to protect it. FIG. 10 also schematically illustrates a conventional binder clip 124 (see FIG. 1 of U.S. Pat. No. 7,305,741) having an end 125 which can be opened by moving the free ends of levers 126 toward each other to clamp a covering 11 (FIG. 1) onto a spoke portion 121. As many binder clips 124, or like clamping elements, as necessary are used to hold the covering in place. The levers 126 can be removed after attachment, and re-attached when the covering is to be removed.

The invention is to be accorded the broadest interpretation of the appended claims so as to encompass all equivalents, and to specifically encompass all specific ranges within a broad range, and is to be limited only by the prior art.

What is claimed:

1. A method of removing carbon dioxide from substantially ambient air by placing at least one material capable of reacting with carbon dioxide to produce fertilizer in the path of movement of substantially ambient air; wherein the material capable of reacting with carbon dioxide is associated with a fabric by wash coating, impregnating, solution coating, irradiating, plasma treating, or chemically acting upon the fabric using the material capable of reacting with carbon dioxide; and comprising placing the fabric in the path of substantially ambient air movement.

2. A method as recited in claim 1 wherein the material comprises a potassium and/or nitrogen containing compound that will ultimately react with ambient carbon dioxide.

3. A method as recited in claim 2 wherein the fertilizer produced is potassium carbonate, potassium bicarbonate, and/or ammonium bicarbonate, and is ultimately put into contact with soil to fertilize plants.

4. A method as recited in claim 1 further comprising placing the fabric and material on a moving portion of a wind turbine; and wherein the wind turbine provides mechanical force by rotating in response to ambient wind; and further comprising utilizing the mechanical force to perform useful work.

5. A method as recited in claim 4 further comprising applying a mist containing water to the material at spaced time intervals if the humidity conditions are insufficient, using at least one nozzle stationarily mounted with respect to wind turbine rotation, positioned below the wind turbine and controlled by a controller.

6. A method as recited in claim 1 wherein the fabric is biodegradable when in contact with soil, and further comprising, after carbon dioxide removal to produce fertilizer, putting the fabric into direct contact with soil.

7. A method as recited in claim 1 wherein the fabric is biodegradable, and further comprising, after carbon dioxide removal to produce fertilizer, shredding the fabric and then putting the fabric into contact with soil.

8. A method as recited in claim 1 wherein, after carbon dioxide removal to produce fertilizer, burning the fabric to produce useful energy and an ash, and applying the resulting ash to soil.

9. A method as recited in claim 3 further comprising applying calcium and/or magnesium to the soil to which the fertilizer is applied; and wherein the material comprises potassium hydroxide, potassium superoxide, potassium carbonate, and/or ammonia.

10. A method as recited in claim 5 wherein the water mist is applied whenever the ambient humidity is less than about 40-50%.

11. A method of removing carbon dioxide from substantially ambient air by placing at least one material capable of reacting with carbon dioxide to produce fertilizer in the path of movement of substantially ambient air wherein the material is applied to a wind-engaging surface of a wind turbine; and wherein the wind turbine provides mechanical force by rotating in response to ambient wind; and further comprising utilizing the mechanical force to perform useful work.

12. A method as recited in claim 11 further comprising applying a mist containing water to the material if the ambient humidity is less than about 40-50%.

13. A method as recited in claim 11 wherein the material capable of reacting with carbon dioxide is associated with a fabric, and comprising placing the fabric on the wind turbine in the path of substantially ambient air movement.

14. A method of removing carbon dioxide from substantially ambient air by placing a potassium containing compound capable of reacting with carbon dioxide to produce fertilizer in the path of movement of substantially ambient air; wherein the material capable of reacting with carbon dioxide is associated with a fabric; and further comprising placing the fabric in the path of substantially ambient air movement.

15. A method as recited in claim 14 wherein the fertilizer produced is potassium carbonate and/or potassium bicarbonate, and is ultimately put into contact with soil to fertilize plants.

16. A method as recited in claim 14 further comprising placing the fabric and material on a moving portion of a wind turbine; and wherein the wind turbine provides mechanical force by rotating in response to ambient wind; and further comprising utilizing the mechanical force to perform useful work.

17. A method as recited in claim 14 wherein the fabric is biodegradable, and further comprising, after carbon dioxide removal to produce fertilizer, shredding the fabric and then putting the fabric into contact with soil.

* * * * *